United States Patent [19]

Ortlieb et al.

[11] 4,139,831
[45] Feb. 13, 1979

[54] CONTROL FOR ELECTRICAL POSITIONING DRIVES

[75] Inventors: Wolfgang Ortlieb, Leinfelden-Echterdingen; Friedrich Grossmann, Rohrdorf, both of Fed. Rep. of Germany

[73] Assignee: Georgii-Kobold August Heine KG, Leinfelden, Fed. Rep. of Germany

[21] Appl. No.: 846,990

[22] Filed: Oct. 31, 1977

[30] Foreign Application Priority Data

Oct. 29, 1976 [DE] Fed. Rep. of Germany ....... 2649251

[51] Int. Cl.² ............................................ H01C 10/16
[52] U.S. Cl. .................................... 338/128; 338/118; 338/123; 338/138; 338/140; 338/153; 338/162; 338/188; 338/190; 338/320; 338/325
[58] Field of Search ................. 338/89, 118, 128, 122, 338/123, 125, 127, 138–140, 153, 162, 160, 165, 183, 185, 188, 190, 191, 176, 320, 325

[56] References Cited

U.S. PATENT DOCUMENTS

| 1,772,361 | 8/1930 | Mross et al. | 338/191 X |
| 3,307,133 | 2/1967 | Wolff | 338/188 X |
| 3,965,454 | 6/1976 | Puerner | 338/176 X |

FOREIGN PATENT DOCUMENTS 2023118  5/1970  Fed. Rep. of Germany ........... 338/153

*Primary Examiner*—C. L. Albritton
*Attorney, Agent, or Firm*—Wigman & Cohen

[57] ABSTRACT

An apparatus for the control of variable speed electrical positioning drives, especially for sewing machine positioning drives, is disclosed in two exemplary embodiments. The apparatus provides a preset nominal value of speed and a range of adjustment for additional signals in digital form, thus making possible a continuous or incremental change in the nominal value as well as additional digital signals. The apparatus includes lamellar contact elements of a potentiometer arranged on a base element in the path of a slider for the nominal value of speed and at least one low resistance lamellar contact element arranged in the slider path for producing an additional digital signal.

11 Claims, 7 Drawing Figures

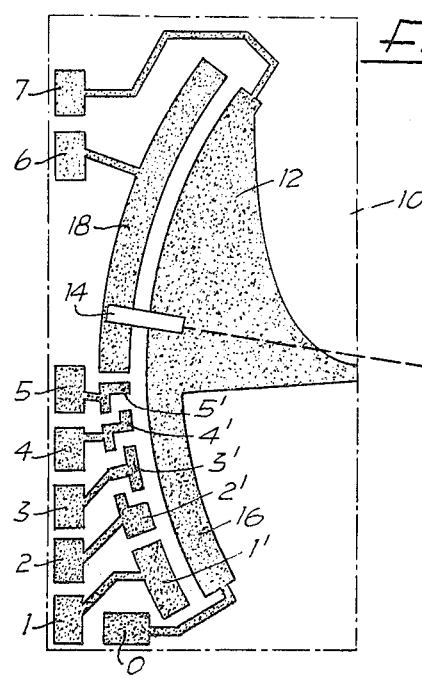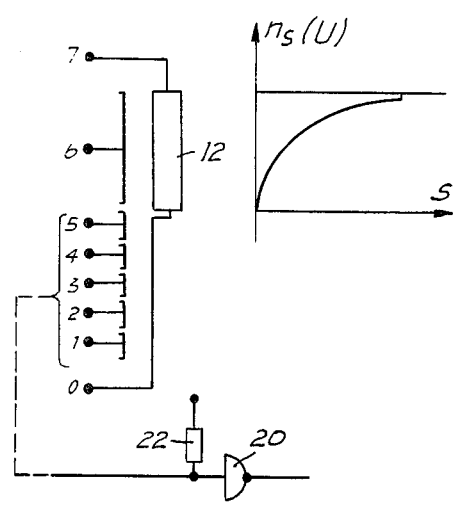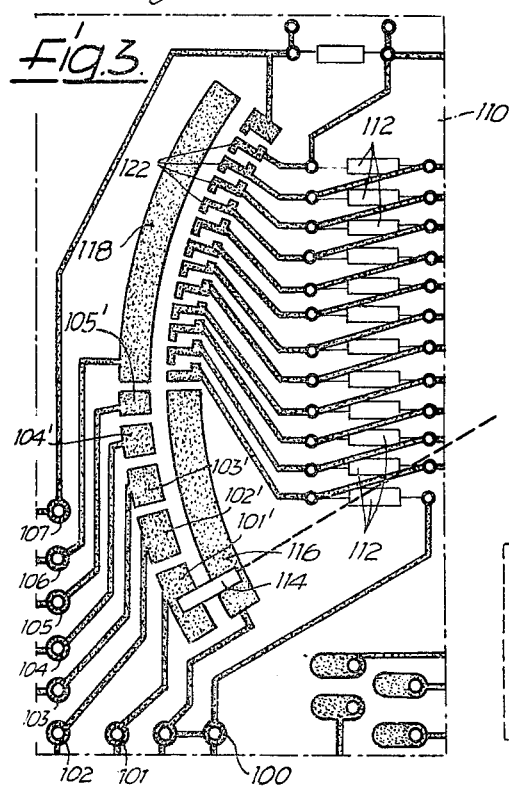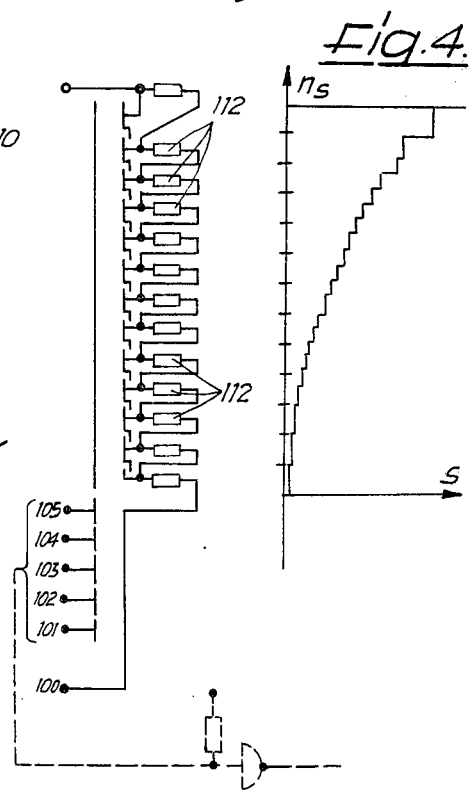

CONTROL FOR ELECTRICAL POSITIONING DRIVES

BACKGROUND OF THE INVENTION

The present invention relates to a control for electrical positioning drives with variable speed, and more particularly to a control for sewing machine positioning drives, with a range of adjustment providing the given nominal value of the speed and a range of adjustment for at least one additional signal in digital form.

In the case of a known, optoelectronic control of this general type, not only the additional signals, but also the signals providing the given nominal value of the speed are produced in digital form. The non-contact production of the signals is actually of advantage in this case. However, with an increasing number of the discrete nominal values of the speed, i.e., a decrease of the increments between the individual nominal values, the cost of this control appreciably increases owing to the necessary enlargement of the optoelectronic elements.

It is also known for the non-contact production of the nominal values of the speed, for example, by West German Pat. No. 2,135,777, to utilize a sound generator and a magnet adjustable vis-a-vis the generator. In this instance, the nominal value of the speed is infinitely variable. The nominal value is, however, dependent on the mechanical tolerances and on the temperature. Furthermore, switches must be provided for the production of the additional digital signals which clearly increase the cost, particularly because of the required adjustment. This is also applicable to another known control disclosed in West German Pat. No. 1,763,853, in the case of which the non-contact and continuous production of the nominal values of the speed is effected by means of a transmitter with an adjustable coupling factor.

In the case of another control described in West German Pat. No. 1,640,113, the nominal values of the speed as well as the additional signals are produced by means of several flat spring contact units. The disadvantage of this control is the considerable expenditure for the adjustment of the flat spring contact units as well as the dimension and number of the flat spring contact units which increase with the continuous decrease of the increments between two successive nominal values of the speed.

SUMMARY AND OBJECTS OF THE INVENTION

The present invention is based on the task of providing a control of the kind mentioned in the introduction which makes it possible to produce a continuous change in the nominal values or a change in small increments as well as additional digital signals but still involves low cost and as small a space requirement as possible. This problem has been solved by the invention in such a manner that lamellar-designed contact elements of a potentiometer are arranged on a base element in the path of a slider and, following this section of the path, at least one lamellar-designed contact element with a low resistance for the production of an additional signal.

The space requirement of such a control is essentially determined by the space requirement of the basic element and of the slider which is minimal since the basic element can be a relatively thin and small substrate plate. Furthermore, such a control is extremely low in cost independently of whether a continuous or a small increment change in nominal value is provided since the potentiometer as well as all contact elements can be arranged on the basic element in the form of a layer and no adjustment is required. Another advantage is the fact that there is no significant dependence on temperature and that the manufacturing tolerances are not of importance.

If the potentiometer consists of individual resistance elements connected in series, it is advantageous that the contact elements adjacent to each other, with which the connecting points between the individual resistors are connected, overlap in a contact-free manner in the direction of the motion of the slider. It is then possible to produce, in an intermediate position in which the slider simultaneously touches the overlapping sections of the two contact elements adjacent to each other, a nominal value which, with regard to its size, is between the two nominal values which are determined when the slider contacts only one or the other contact element.

If, as is the case in a preferred embodiment, the surface of the contact elements and contact paths over which the slider passes is coated with abrasion-proof, conductive plastic material or with an abrasion-proof, precious metal, then a very long life can be obtained without any difficulties.

BRIEF DESCRIPTION OF THE DRAWINGS

Below, the invention is explained in detail by means of two embodiments of the invention shown in the drawings, wherein:

FIG. 1 is a top view of a first embodiment of the invention;

FIG. 2 is a wiring diagram of the first embodiment and a diagram showing the dependence of the size of the nominal value of the speed on the adjusting path of the slider;

FIG. 3 is a top view of a second embodiment of the invention;

FIG. 4 is a wiring diagram of the second embodiment and a diagram showing the size of the nominal value of the speed as a function of the adjusting path of the slider;

DETAILED DESCRIPTION OF A PREFERRED EMBODIMENT

Figure 7:
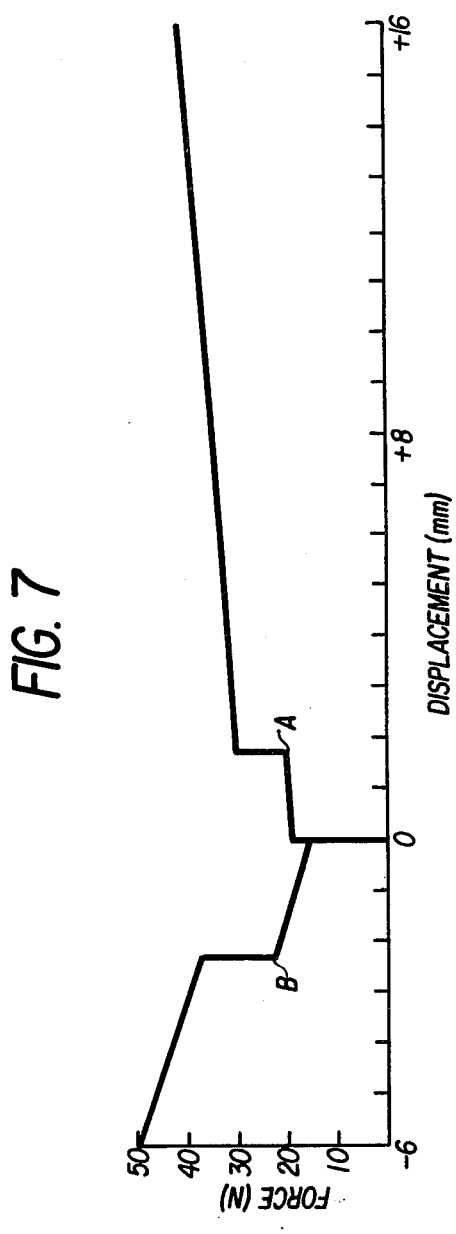
FIG. 7 is a force-displacement diagram of the element of FIG. 6.

A control for an electrical positioning drive with variable speed, which comprises a sewing machine positioning drive in the described exemplary embodiments, has a plate-like basic element 10 in the form of a small ceramic substrate plate. The surface of the basic element 10 has a resistance layer 12, one edge of which describes a circular arc whose center coincides with the axis of rotation of a slider 14. In the exemplary embodiment, the axis of rotation of the slider 14 is located outside the basic element 10. However, it could, of course, also be located within the basic element. The radial width of the resistance layer 12, i.e., its dimensions in the longitudinal direction of the slider 14, varies from one end to the other, i.e., in the arcuate direction of the motion of the slider 14, in accordance with the desired dependence of the value picked up with the slider 14 on the slider position. In this embodiment, the width of the resistance layer 12 decreases exponentially.

The end of the resistance layer 12 with the maximum width is connected with a contact path 16 which has the form of a circular ring section or arc and has a low impedance. The edge of the contact path 16 having the larger radius of curvature is on the same arcuate path or radius as the arcuate curved edge of the resistance layer 12. The end of the contact path 16 disposed away from the resistance layer 12 is connected with a connecting element 0 by means of a connecting line which is, like the connecting element, formed by an electrically highly conductive layer on the surface of the basic element 10. The end of the resistance layer 12 remote from the contact path 16 is connected with a connecting element 7 through a connecting line which is formed, together with its connecting element, by an electrically highly conductive layer on the basic element 10. Along the arcuate, curved edge of the resistance layer 12, but a uniform distance from the same, a contact path 18 is provided in addition to the resistance layer 12, in the form of a section of a circular ring which consists of an electrically highly conductive layer on the surface of the basic element 10. Contact path 18 is connected via a connecting line with a connecting element 6 arranged at a spacing from the connecting element 7 at a lateral side area of the basic element 10 as shown on the left-hand side in FIG. 1. The resistance layer 12 and the contact path 18 form a potentiometer together with their connecting elements and the slider 14 which contacts the lateral area along the circular edge of the resistance layer 12, within the area of its movement over which the contact path 18 and the resistance layer 12 extend.

Adjacent the end of the contact path 18 associated with the greatest width of the resistance layer 12 are arranged in sequence individual contact elements 5' to 1' which are each connected with a connecting element 5 to 1 via a connecting line. The connecting elements 1 to 5 are arranged at a spacing adjacent one another along the same side of the basic element 10 as the connecting elements 0 and 7 and comprise, in the same manner as the connecting lines and the contact elements 1' to 5', an electrically highly conductive layer on the surface of the basic element 10. The form of the contact elements 1' to 5' depends, on the one hand, on the angular area within which the slider 14 is adapted to contact them, and, on the other hand, whether a simultaneous contacting of two contact elements arranged adjacent each other by the slider is or is not desired or possible.

Figure 5:
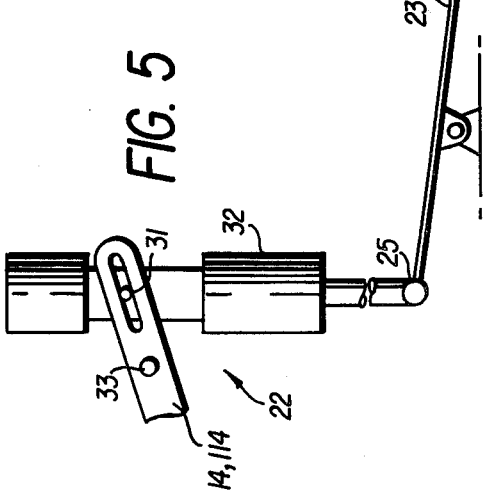
FIG. 5 is a schematic view of the mechanism for operating the slider.

The innermost sliding path of the slider 14, which is formed by the contact path 16 and the lateral area of the resistance layer 12 following it, as well as the outer sliding path, which is formed by the contact path 18 and the contact elements 5' to 1', are coated with an abrasion-proof, conductive plastic material which can also be substituted by an abrasion-proof, precious metal. If, as is the case with the exemplary embodiment, the control is associated with a sewing machine positioning drive, then the slider 14 is operated by means of a pedal as shown in FIG. 5 and described more fully hereinafter. If, for example, the connecting element 0 is at a potential of zero volts and the connecting element 7 is connected with the supply voltage, then, at the connecting element 6, a voltage is available as a nominal value of the speed which is dependent on the position of the slider in the same manner as a resistor. Therefore, the dependence on the adjusting path s of the slider 14, as shown in the diagram in FIG. 2, is obtained for a voltage U and a nominal value of the speed $n_s$.

Within the area of the motion of the slider 14 following the minimum nominal value of the speed, the slider 14 is in a position to connect the contact elements 1' to 5' with the contact path 16. As is shown by the diagram in FIG. 2, the inputs to the logic elements of a logic circuit 20 can be directly selected from the connecting elements 1 to 5. A resistor 22 connected to the supply voltage of the logic circuit 20 serves only the purpose of obtaining the necessary freedom from interference in case this input is not connected with a potential of zero volts through the slider. This means that digital signals can be produced within the area of the contact elements 1' to 5' by means of the slider 14; in the case of the illustrated embodiment, there are five digital signals. A click-stop device, shown in FIGS. 5 and 6, insures that the slider 14 can be maintained in the position necessary to produce the signals.

The second embodiment of the invention shown in FIGS. 3 and 4 differs from the embodiment according to FIGS. 1 and 2 essentially by the fact that, instead of a single resistance layer, series-connected resistors 112 are provided which, in the embodiment shown, comprise surface resistors formed on the basic element 110, but could also be formed by individual structural elements. The input of this series resistor connection is connected with a connecting element 100 via a connecting line. The connections between the successive resistors 112, the dimensions of which are determined by the desired dependence of the picked-off voltage on the position of the slider 114, are each connected with a contact element 122 via a connecting line as is shown in FIG. 3 and schematically in FIG. 4. The contact elements 122 are arranged adjacent each other on a circular path in the same sequence in which the associated connecting points follow each other, with the following circular contact path 116 corresponding to the contact path 16 of FIG. 1 and has the same radius of curvature. With the exception of the first and last elements, the contact elements 122 have a substantially Z-shape and are arranged adjacent each other in such a manner that the angle-shaped shanks of two adjacent contact elements which are directed toward each other, overlap in the direction of the motion of the slider 114 without contacting each other. In this way, it is possible for the slider 114 to simultaneously contact two adjacent contact elements. The length of the overlapping shanks is selected in such a manner that, with equi-angular increments, the slider 114, in turn, contacts only one of the contact elements, then two adjacent contact elements, then again only one element and so on. In this way, it is possible to still pick-off an intermediate value in addition to the resistance or voltage increments which can be picked-off at the individual contact elements 122. This leads to an increase in the number of the voltage increments and, thus, in the number of the nominal values which can be preset to twenty-one in the case of the thirteen resistors selected in the exemplary embodiment. Such a fine graduation of the preset nominal value closely approximates the continuously preset nominal value of the first embodiment of FIG. 1 as is shown by the dependence of the nominal value of the speed $n_s$ on the adjusting path s of the slider 114 in FIG. 4.

The contact elements 122, as well as their connecting lines, are formed by conductor layers on the surface of the plate-shaped basic element 110 consisting of a printed circuit board material.

The end of the series connection formed by the resistors 112 is connected with the next to last contact element 112 as well as a connecting point. The last contact element 122 is connected with this connecting point through a resistor, as well as with an additional connecting point 107 via a connecting line. The contact path 118 which is contacted by the slider 114 when it is located in the area of the contact elements 122 is designed in the same way as the contact path 18 of FIG. 1 and is arranged at a radial spacing from the contact elements 122. Contact path 118 is connected with a connecting point 106 through a connecting line. The contact path 118 is followed by the contact elements 105' to 101' which provide for the production of the additional digital signals and which differ from the contact elements of the first embodiment only in that they all are of rectangular form, i.e., they do not overlap. As is shown in FIG. 4, the evaluation or use of the digital signals is effected in the same manner as in FIG. 1. As in that case, an analog range or digital range, respectivly, is associated with the two angular areas of the slider 114 which follow one another. The contact paths 116 and 118 as well as the contact elements 122 and 101' to 105' are provided with a particularly abrasion-proof, precious metal coating.

Both embodiments of the invention are particularly advantageous in that the digital signals can be utilized for the setting and erasing of memories whereby only two of the sliding paths contacted by the slider are required. For example, a memory can be set by the connecting element 1 or by the connecting point of the second embodiment, corresponding to the connecting element 1, which is erased with the passing of the slider onto the contact element 5' or the corresponding contact element of the second embodiment. After erasing the memory, an adjustable basic nominal value is first set which is then followed by additional continuous or graduated nominal values of the speed in accordance with the slider position in the area of the potentiometer. In this way, it is possible to reduce the voltage which can be picked-off at the connecting element 5 or at the connecting point 106 for the presetting of nominal speeds through a variable resistance over the entire analog area whereby the basic nominal value is always maintained.

Figure 6:
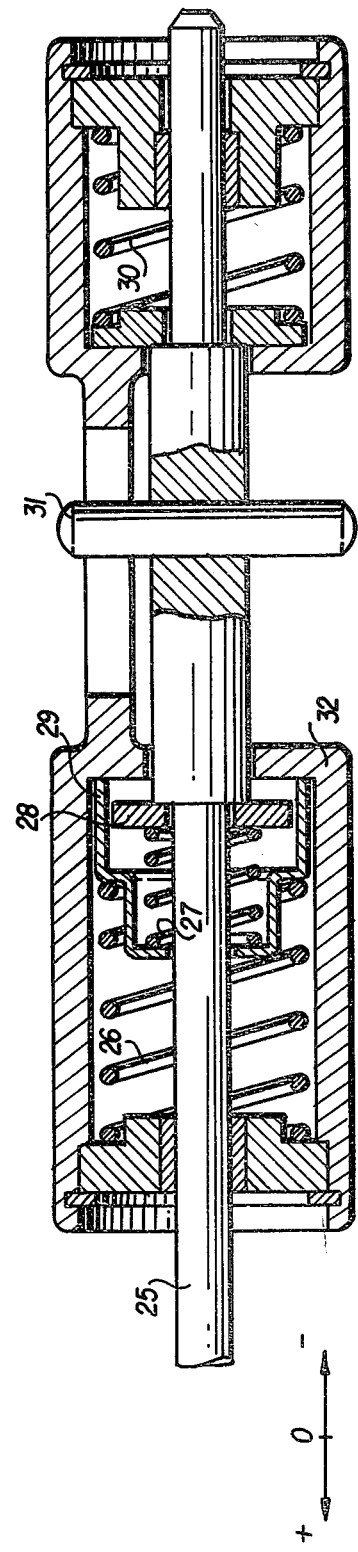
FIG. 6 is a cross-sectional detail of one element of the mechanism of FIG. 5.

The construction and method of operation of the click-stop device will now be described. The click-stop device 22 for operating the slider 14, 114 shown in FIGS. 5 and 6 is activated by means of a pedal 23, which is mounted in the manner of a rocker arm (counterpoise). An activating rod 25 is connected with the pedal 23 in such a manner that it moves toward the left or positive direction as viewed in FIG. 6 when the forward end of the pedal is moved downwardly. The movement of the activating rod 25 is transferred to the slider 14, 114 by the cross pin 31. The arm forming the slider, therefore, has a slit spaced from its axis of rotation 33, in which the cross pin 31 engages. The downward movement of the cross pin 31 rotates the slider clockwise, as viewed in FIGS. 1 and 2.

As will be appreciated from the drawings, the click-stop device 22 has no interengaged stop elements. On the contrary, certain pedal positions and thereby certain positions of the slider are defined only by sudden changes in the activating force, as shown in the diagram of FIG. 7 which shows the dependence of the necessary activation force on the shift path or displacement of the activating rod 25.

If the activating rod 25 is moved from the illustrated zero displacement position in the positive direction, that is, to the left in FIG. 6, then initially only the spring 27 is compressed until the disc 28 abuts the casing 29 containing the spring 27. This occurs with a movement of 2 mm (point A). Should the activating rod 25 be pushed even further in the positive direction, then the activating force first increases suddenly and sharply because the spring 26 is thereby compressed. The force necessary for a further movement then increases linearly, as FIG. 7 illustrates.

With a movement of the rod 25 from the zero displacement position in the negative direction, that is, to the right as seen in the sketch, the spring 30 is first compressed. The spring 27 simultaneously relaxes, until the disc 28 abuts the housing 32. This occurs at point B in FIG. 7. A further movement of the activating rod 25 in this direction causes only a compression of the spring 30. The result, therefore, is a sudden increase in the necessary activating force. Thereafter, the activating force increases linearly, as shown in FIG. 7.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A control apparatus for electrical variable speed positioning drives, especially for sewing machine positioning drives having a range of adjustment providing a preset nominal value of speed and a range of adjustment for at least one additional signal in digital form comprising a base element, potentiometer means arranged on said base element for producing said preset nominal value, said potentiometer means including at least one first lamellar contact element, slider means having a path of travel for contacting said first contact element, and at least one second lamellar contact element having a low resistance and arranged adjacent said first contact element in the path of travel of said slider means for producing said additional digital signal.

2. Control apparatus according to claim 1, wherein said potentiometer means comprises a resistive layer disposed on said base element.

3. Control apparatus according to claim 2, wherein said resistive layer comprises a single surface resistor contacting said slider means in a section of said path of travel which serves for presetting the nominal value of speed, said resistor having a form for varying the resistance thereof as a function of the position of said slider means in said section.

4. Control apparatus according to claim 3, wherein a lateral area of said surface resistor is in said path of travel of the slider means.

5. Control apparatus according to claim 1, wherein said potentiometer means further includes a plurality of first lamellar contact elements and a plurality of resistance elements connected in series, said series connection of resistance elements having a connection at each end of such series and a connection between successive resistance elements, each said connections being connected with a first lamellar contact element.

6. Control apparatus according to claim 5, wherein said first lamellar contact elements are arranged adjacent one another along the path of travel of the slider means, next adjacent first lamellar contact elements including portions overlapping one another in the direction of the path of travel of the slider means in a noncontacting relation.

7. Control apparatus according to claim 6 wherein at least some of said first lamellar contact elements comprise a central section from which laterally extends in opposite directions two of said overlapping portions along said path of travel, the length of said overlapping portions being substantially equal to the width of said central section as measured in the direction of said path of travel.

8. Control apparatus according to claim 1, wherein said lamellar contact elements are arranged in two arcuate lamellar contact paths of different radii, one of said contact paths including a center pick-off for the potentiometer means and said at least one second lamellar contact element, the other of said contact paths including the first lamellar contact element and a low resistance contact element arranged adjacent the second lamellar contact elements.

9. Control apparatus according to claim 1, wherein the surface of all said contact elements is coated with an abrasion-proof, conductive plastic material.

10. Control apparatus according to claim 1, wherein the surface of all said contact elements is coated with an abrasion-proof precious metal.

11. Control apparatus according to claim 1, including a stop means connected to said slider means for moving said slider means along said path of travel in response to a force applied to said stop means.

* * * * *